(12) United States Patent
Le et al.

(10) Patent No.: US 7,909,054 B2
(45) Date of Patent: Mar. 22, 2011

(54) SHANK ASSEMBLY FOR A FILL VALVE

(76) Inventors: Tuan Le, Diamond Bar, CA (US); Bill DeKeyser, Rancho Santa Margarita, CA (US); Robert Collin, Lake Forest, CA (US)

( * ) Notice: Subject to any disclaimer, the term of this patent is extended or adjusted under 35 U.S.C. 154(b) by 703 days.

(21) Appl. No.: 11/890,419

(22) Filed: Aug. 6, 2007

(65) Prior Publication Data
US 2008/0035206 A1    Feb. 14, 2008

Related U.S. Application Data

(60) Provisional application No. 60/836,869, filed on Aug. 9, 2006.

(51) Int. Cl.
*F16K 31/18* (2006.01)

(52) U.S. Cl. ........ 137/426; 137/436; 251/126; 251/127; 138/42

(58) Field of Classification Search .................. 137/334, 137/426, 429, 430, 432, 434, 436, 442, 444; 138/42, 43, 46; 251/118, 121, 126, 127
See application file for complete search history.

(56) References Cited

U.S. PATENT DOCUMENTS

| | | | | | |
|---|---|---|---|---|---|
| 1,497,796 | A | * | 6/1924 | Sherwood | 137/437 |
| 1,839,042 | A | * | 12/1931 | McPartland | 137/426 |
| 1,889,566 | A | * | 11/1932 | Pasman | 251/229 |
| 2,105,314 | A | * | 1/1938 | Duncan et al. | 137/445 |
| 2,598,195 | A | * | 5/1952 | Smith | 137/416 |
| 2,607,364 | A | * | 8/1952 | Smith | 137/218 |
| 2,619,122 | A | | 11/1952 | Hunter | |
| 2,623,537 | A | * | 12/1952 | Vigliotti | 137/437 |
| 2,770,250 | A | * | 11/1956 | Smith | 137/426 |
| 3,351,415 | A | * | 11/1967 | Hoffman | 401/137 |
| 3,534,830 | A | * | 10/1970 | Kaila | 181/234 |
| 5,623,961 | A | * | 4/1997 | Nichols-Roy | 137/377 |
| 5,715,859 | A | | 2/1998 | Nichols-Roy | 137/426 |
| 5,964,247 | A | | 10/1999 | Johnson | |
| 6,199,581 | B1 | | 3/2001 | Gil | |
| 6,755,209 | B2 | | 6/2004 | Wey | 137/414 |

\* cited by examiner

*Primary Examiner* — Craig M Schneider
(74) *Attorney, Agent, or Firm* — Gordon & Rees LLP

(57) ABSTRACT

A fill valve for a toilet tank includes a multi-piece shank assembly. The shank assembly includes a first hollow member coupled with a second hollow member using a snap joint. The first hollow member has a tortuous outer surface, which together with the second hollow member forms a plurality of flow paths. The flow paths are configured to reduce water noise. The first and second hollow members are provided separately, resulting in simplified molding process and improved assembly automation.

7 Claims, 8 Drawing Sheets

SHANK ASSEMBLY FOR A FILL VALVE

RELATED APPLICATIONS

This application relates to, claims priority from, and incorporates herein by reference, as if fully set forth, U.S. Provisional Patent Application Ser. No. 60/836,869 filed on Aug. 9, 2006 and entitled "TWO PIECE SHANK."

BACKGROUND OF THE INVENTION

1. Field of the Invention

The present invention relates generally to toilet fill valves and particularly to shank assemblies for such toilet fill valves.

2. Description of Prior Art and Related Information

A toilet tank typically employs plug and flapper tank valve that is levered open, which remains open while a full tank is emptied. A fill valve provides water from a supply line to the toilet tank. The fill valve is open whenever the water level in the tank is below a predetermined level. Efforts have been spent reducing the noise when water refills the tank through the fill valve.

A fill valve typically includes a shank assembly. The core of the conventional shank assembly is a unitarily formed, complex piece having an inner cylinder and an outer cylinder. A water path is formed between the inner cylinder and the outer cylinder.

Molding the complex core as a single piece including the unitarily formed inner and outer cylinders poses major challenges. The molds need to have large sizes in order to accommodate the complex features of the core of the conventional shank assembly. The geometry of the conventional shank assembly creates areas where the only way to mold the complex core is to have thick sections of plastic material. The thick sections are subject to voids and stress that weaken the structure of the valve. The thick sections of plastic also cause the cycle time to be long. The weak areas of the complex piece, combined with the difficult "core pull" process, limit the choice of suitable materials for molding the shank conventionally.

The complex structure of the core of the conventional shank assembly also causes problems when the automated assembly process is adopted. To solve this problem, an additional component, i.e., a positioner, is included in the conventional shank assembly for the sole purpose of aiding the assembly process.

A third component of the conventional shank assembly, i.e., an O-ring, is used to seal a gap between the shank and a valve body, which partially covers the shank. However, fitting the O-ring in the gap between the shank and the valve body is a difficult process.

When the fill valve is hand assembled in small quantities, the conventional shank assembly does not cause many problems. However, in automated assembling process, aligning the parts and installing the O-rings become problematic.

SUMMARY OF THE INVENTION

The present invention provides structures and methods that overcome the deficiencies, such as difficulty in molding and assembly processes, and noise during operation, in the prior art.

In one aspect, the present invention provides a fill valve apparatus for filling a tank with fluid. The apparatus includes a shank assembly, which has a first hollow member having a tortuous outer surface, and a second hollow member coupled to the first hollow member to form a plurality of flow paths between the tortuous outer surface and the second hollow member.

In a preferred embodiment, the plurality of flow paths include a plurality of spiraled flow paths, wherein a pitch of the spiraled flow paths decreases gradually along the flow paths for reducing cavitation in the fluid flowing along the flow paths.

In one embodiment, the first hollow member includes a plurality of alignment ribs for aligning the first and second hollow members during assembly, and the second hollow member includes a plurality of alignment slots corresponding to the plurality of alignment ribs of the first hollow member.

Preferably the first hollow member also includes a plurality of flow adjusting ribs located downstream of the tortuous outer surface.

In an embodiment, the first hollow member has a threaded section for securing the apparatus to the tank, a rounded portion adjacent the threaded section for increasing a strength of the first hollow body, and a lower flange between the rounded area and the threaded section.

In a preferred embodiment, a top portion of the first hollow member and a top portion of the section hollow member form a snap joint for coupling the first hollow member with the second hollow member. The first hollow member may have a plurality of windows adjacent the snap joint for allowing the fluid to flow to the at least one flow path.

The second hollow member may have a squared off flange for aiding an automated assembly process.

In a preferred embodiment, the second hollow member has a threaded outer surface. The threaded outer surface of the second hollow member includes a plurality of thread sections. The apparatus may further include a third hollow member coupled to the shank assembly, wherein the third hollow member has a plurality of locking bumps in an inner surface, the locking bumps being coupled to the plurality of thread sections of the second hollow member. The second hollow member may further have a plurality seal beads on an outer surface for substantially sealing a gap between the second hollow member and the third hollow member. The seal beads preferably are formed integrally with the second hollow member.

In one embodiment, the first hollow member and the second hollow member are made of different materials. Preferably the second hollow member is made of a material softer than that of the first hollow member.

According to another aspect of the invention, a shank assembly for a fill valve includes a first hollow member having a tortuous outer surface, and a second hollow member coupled to the first hollow member to form a plurality of flow paths between the tortuous outer surface and the second hollow member.

In a preferred embodiment, the first hollow member includes a plurality of alignment ribs, and the second hollow member has a plurality of alignment slots receiving the plurality of alignment ribs of the first hollow member. The first hollow member may have a plurality of flow adjusting ribs located downstream of the tortuous outer surface, and at least one of the flow adjusting ribs is aligned with one of the alignment ribs.

In one embodiment, the first hollow member comprises a plurality of windows adjacent the snap joint for allowing the fluid to flow to the plurality of flow paths.

In another embodiment, the second hollow member has a threaded outer surface comprising a plurality of thread sections, wherein the plurality of thread sections are symmetrically divided by a plurality of longitudinal ribs.

In another aspect, a method for assembling a toilet fill valve is provided. The method includes providing a first hollow member having a tortuous outer surface, providing a second hollow member separately from the first hollow member, and coupling the second hollow member to the first hollow member to form a shank assembly, the shank assembly having a plurality of flow paths formed between the tortuous outer surface and the second hollow member.

The method preferably further includes aligning a plurality of alignment ribs on the first hollow member with a plurality of alignment slots on the second hollow members.

In one embodiment, the coupling is snuggly coupling the second hollow member onto the first hollow member at a snap joint.

In one embodiment, the second hollow member has a threaded outer surface including a plurality of thread sections separated by a plurality of longitudinal ribs, the method further includes providing a third hollow member having a plurality of locking bumps on an inner surface and a plurality of alignment slots, aligning the plurality of alignment slots of the third hollow member with the longitudinal slots, and coupling the shank assembly with the third hollow member by engaging the locking bumps with the thread sections. The method may further include adjusting a height of the fill valve by rotating the third hollow member relative to the shank assembly, and substantially sealing a gap between the third hollow member and the shank assembly with a plurality of sealing beads on an outer surface of the second hollow member.

In summary, a fill valve for a toilet tank includes a multi-piece shank assembly. The shank assembly includes a first hollow member coupled with a second hollow member using a snap joint. The first hollow member has a tortuous outer surface, which together with the second hollow member forms a plurality of flow paths. The flow paths are configured to reduce water noise. The first and second hollow members are provided separately, resulting in simplified molding process and improved assembly automation.

The invention, now having been briefly summarized, may be better appreciated by the following detailed description.

DETAILED DESCRIPTION OF THE PREFERRED EMBODIMENTS

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

Figure 1:
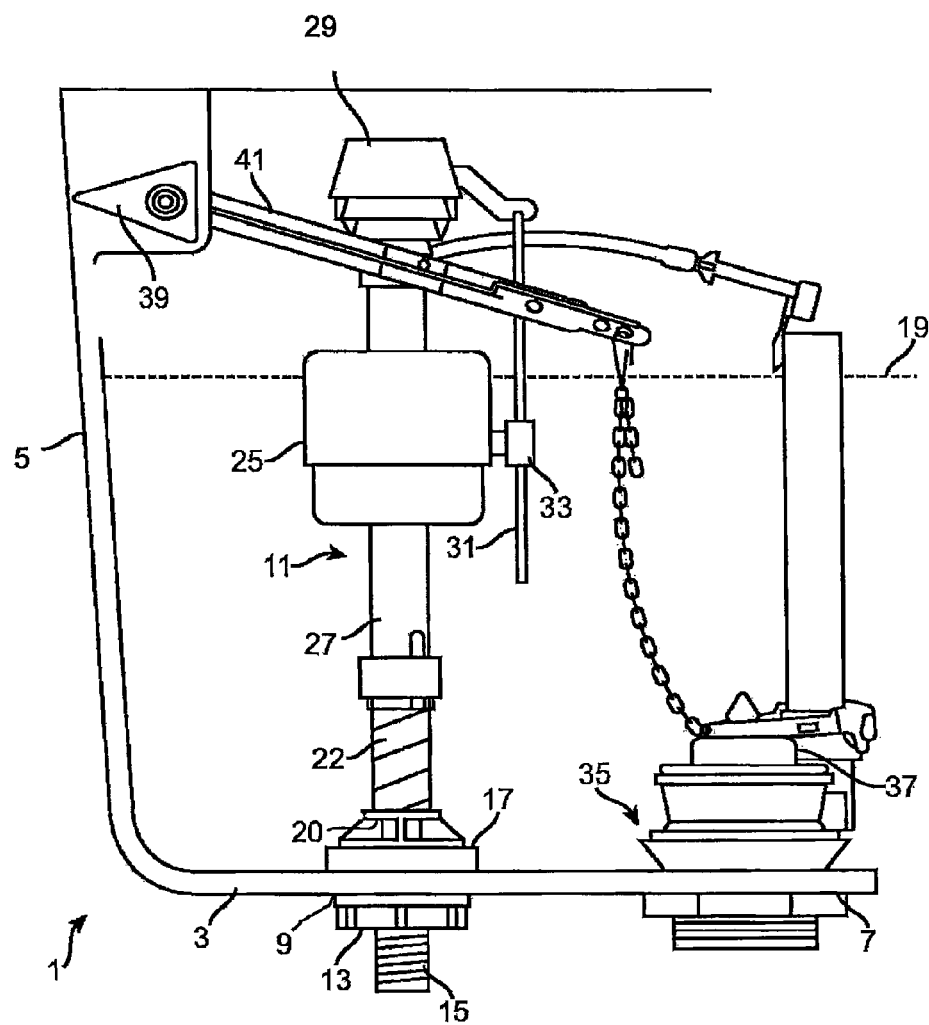
FIG. 1 is a side view of a toilet tank employing the fill valve in accordance with an embodiment of the invention.

As shown in FIG. 1, a toilet tank 1 has a bottom 3 and a peripheral sidewall 5. A water discharge aperture 7 and an inlet aperture 9 are formed in the bottom 3 of the tank 1. The discharge aperture 7 is used for discharging water to flush the toilet bowl, while the inlet aperture 9 is the inlet of fresh water filling the tank 1.

A fill valve 11 in accordance with embodiments of the invention is fitted in the inlet aperture 9 where the fill valve 11 is connected to a water supply line (not shown), and is secured to the bottom 3 of the tank 1 using a lock nut 13 screwing on the threaded section 15 of the fill valve 11. A shank washer 17 prevents water from leaking out of the tank 1 at the inlet aperture 9.

The fill valve 11 remains open when the water level 19 in the tank 1 is below a predetermined elevation, and the fill valve 11 will supply water to the tank 1 via a water path 20 of the fill valve 11. The water path 20 is formed between an inner cylinder and an outer cylinder of the shank assembly 22.

A float 25 is wrapped around a valve body 27, which partially covers the shank assembly 22. Water under pressure in the tap through the inlet aperture 9 is conveyed through the inner cylinder of the fill valve 11 upwards to the valve workings 29. The float 25 follows the water level 19 to actuate the workings 29 via a linkage 31. The linkage 31 has a water level adjustment clip 33 that is used to adjust the predetermined water elevation.

A tank valve 35 is fitted in the water discharge aperture 7. A flapper 37 is used to open and close the tank valve 35. When a flush handle 39 is pressed, the level 41 lifts the flapper 37, allowing the water in the tank 1 to flow into the toilet bowl through the aperture 7. When the water level 19 drops, the float 25 drops following the water level 19, opening the valve 11 to refill the tank 1 through the flow path 20.

Figure 2:
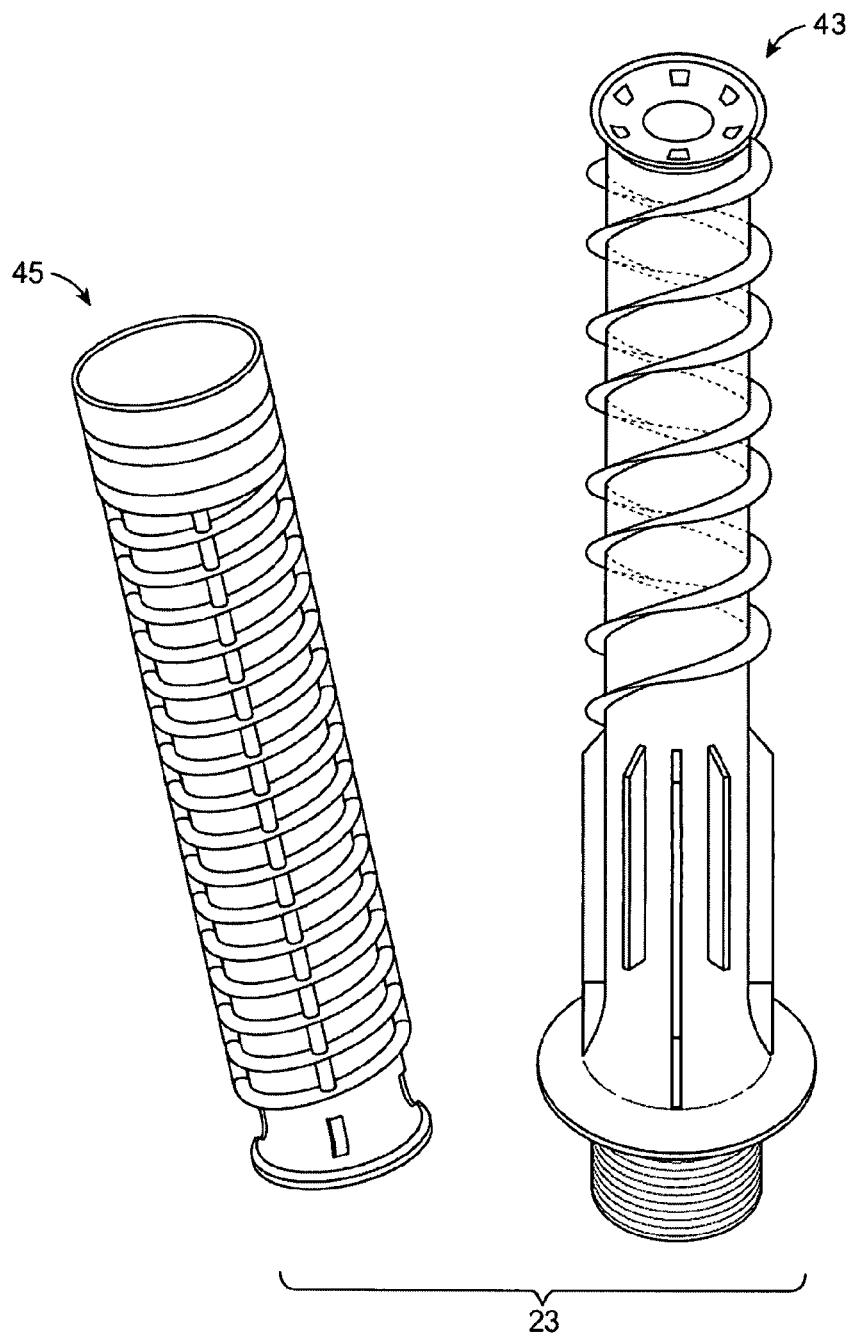
FIG. 2 is a perspective view of two members of the unassembled shank assembly in accordance with a preferred embodiment of the invention.

As illustrated in FIG. 2, a multi-piece shank assembly 23 in accordance with a preferred embodiment of the invention comprises a first hollow member 43, i.e., an inner main shank, and a second hollow member 45, i.e., a shank cover. Accordingly, the multi-piece shank assembly 23 comprises at least two hollow members 43, 45.

Figure 3:
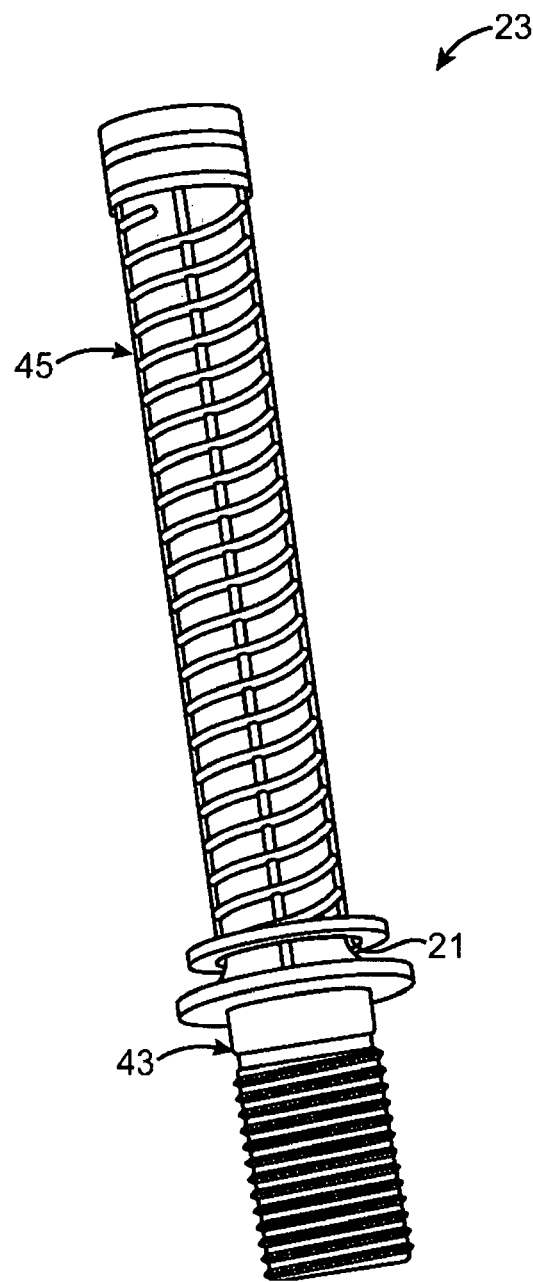
FIG. 3 is a perspective view of the shank assembly of FIG. 2 after assembled.

When assembled, as shown in FIG. 3, the shank cover 45 is telescopically mounted onto the inner main shank 43 to create a flow path 21 between the two hollow members 43, 45. As discussed below, the flow path 21 is configured for reducing noise by reducing the flow velocity and the cavitation of the water flowing therethrough.

Figure 4:
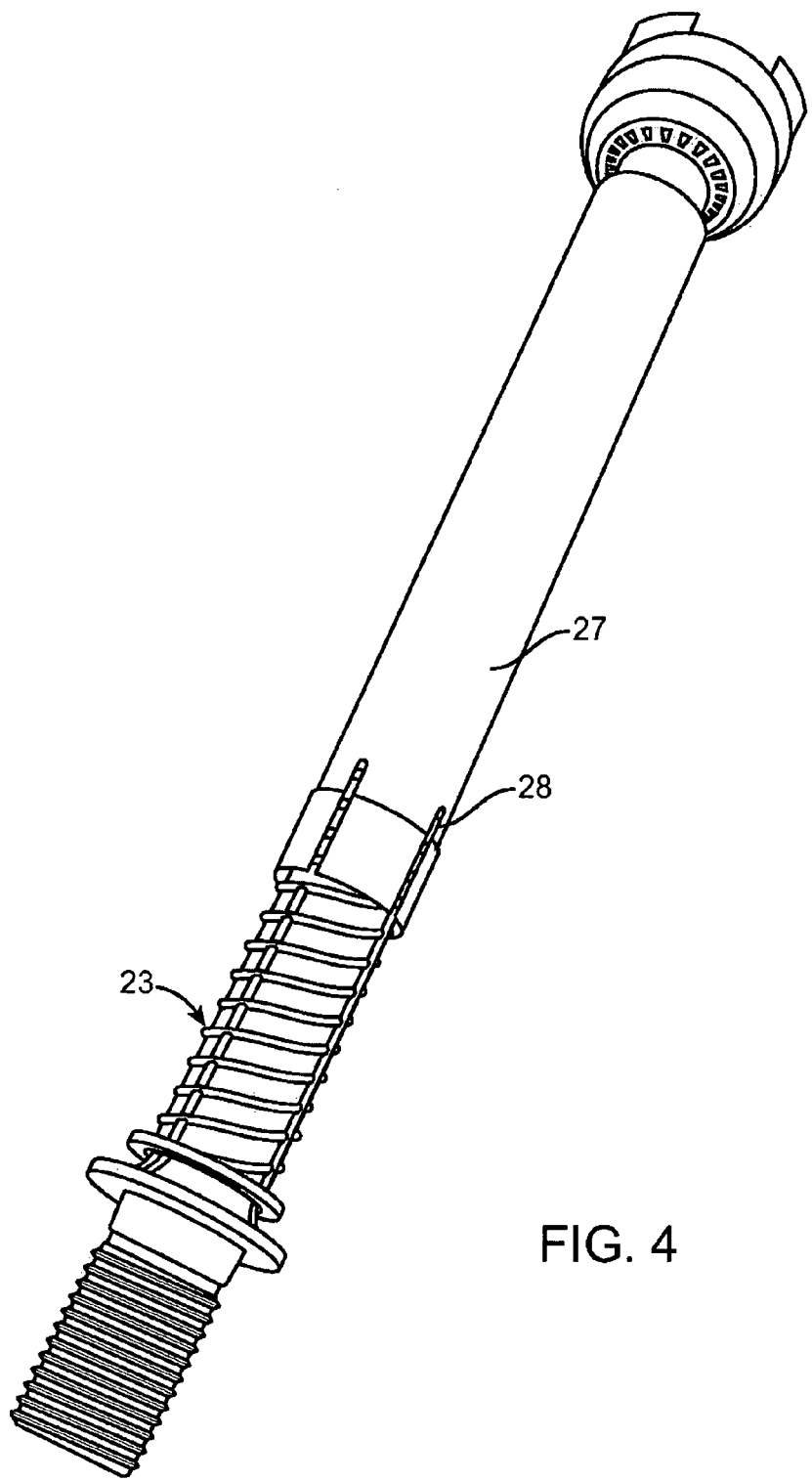
FIG. 4 is a perspective view of the shank assembly of FIG. 3 telescopically coupled to a valve body.

FIG. 4 provides a perspective view of the shank assembly 23 further coupled with a valve body 27. The valve body 27 provides an outer cover for the shank assembly 23, and can be used to control the overall height of the fill valve. As shown, the valve body 27 has a plurality of alignment slots 28.

Figures 5A, 5B, 5C:
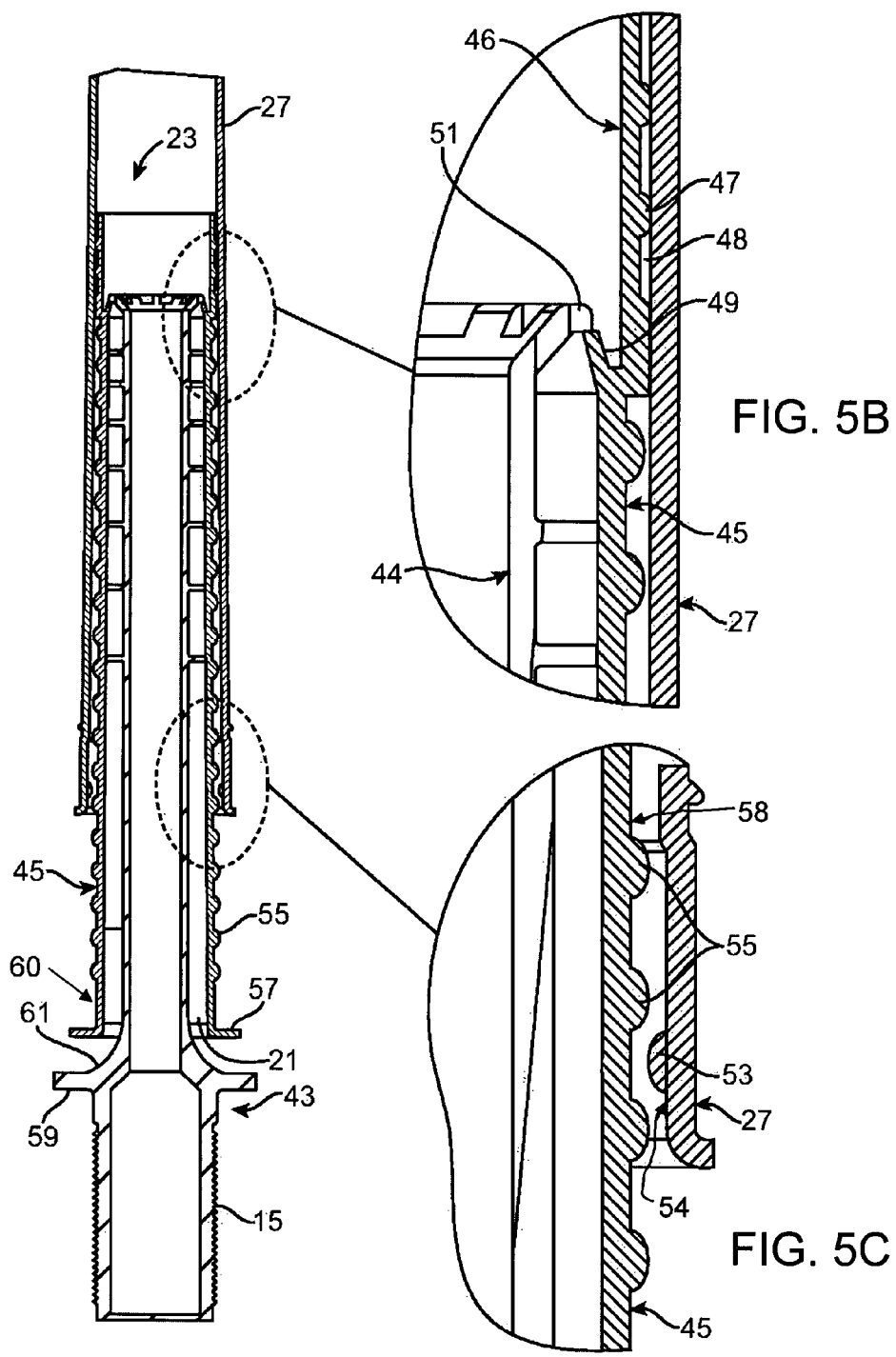
FIG. 5A is a cross-sectional side view of the shank assembly coupled to the valve body.
FIG. 5B is an exploded view of a portion of the shank assembly coupled with the valve body as in FIG. 5A, showing a snap joint and a plurality of seal beads.
FIG. 5C is an exploded view of another portion of the shank assembly coupled with the valve body as in FIG. 5A, showing a locking bump engaged with threads.

FIG. 5A is a cross-sectional view of the shank assembly 23 coupled with the valve body 27. As shown in the exploded view in FIG. 5B, the shank cover 45 has an undercut 49, with which a top portion 44 of the inner main shank 43 forms a snap joint 51. The snap joint 51 allows the shank cover 45 to be installed onto the main shank 43 with a simple push after the two members are aligned. A tight coupling between the shank cover 45 and the inner main shank 43 is thus achieved.

As shown in FIG. 5B, a top portion 46 of the shank cover 45 has a plurality of sealing beads 47 integrally formed on an outer surface of the shank cover 45. The sealing beads 47 substantially seal a gap 48 between the shank cover 45 and the valve body 27. An O-ring is no longer needed for sealing the gap 48. Since the gap 48 is not a water flow path, the seal beads 47 are not required to be entirely watertight so long as they can prevent major leaks through the gap 48.

In accordance with one embodiment of the invention, the main shank 43 and the shank cover 45 are composed of the same material, e.g., plastic. In accordance with a preferred embodiment of the invention, the main shank 43 and the shank cover 45 are made of different materials. The multi-piece design and the separate molding according to embodiments of the invention make it possible to choose different materials for the two hollow members 43, 45. For example, as the main shank 43 is secured to the tank at the threaded section 15 and is subject to most of the stress on the fill valve in operation, a stronger material, such as Acetal or Polyester, may be selected for the main shank 43. The shank cover 45, on the other hand, is used mainly to form the water path 21 together with the main shank 43, and does not need to structurally support the fill valve. Thus, a less strong and more economic material, such as polyethylene, polypropylene, or styrene-butadiene, may be used for the shank cover 45.

In accordance with a preferred embodiment of the invention, the shank cover 45 is made of a softer, more resilient material such that the integrally formed sealing beads 47 are more effective in sealing the gap 48.

As shown in an exploded view in FIG. 5C, the valve body 27 has one or more locking mechanisms 53, such as a plurality of locking bumps 53 in an inner surface 54 of the valve body 27, for engaging threads 55 on an outer surface 58 of the shank cover 45.

Out-of-groove conditions are prevented by the shapes of the locking bumps 53 and threads 55. As shown, the locking bumps 53 and the threads 55 both have curved surfaces, which prevent them from resting on top of each other. In addition, a pitch of the threads 55 is configured such that the gap between threads is not much larger than the locking bump 53. This prevents jiggling of the locking bump 53 and thus also helps prevent any out-of-groove conditions.

Referring back to FIG. 5A, a "squared off" flange 57 at the bottom end 60 of the shank cover 45 is used to align the shank cover 45 during the automated assembly process. The inner main shank 43 has a lower flange 59 adjacent the threaded section 15. The lower flange 59 is used to hold the seal 17 (as shown in FIG. 1) in place. The rounded portion 61 above the lower flange 59 helps strengthen the inner main shank 43 of the shank assembly 23 near the inlet aperture 9 (as shown in FIG. 1) where much of the stress on the shank assembly 23 is sustained during operation.

Figure 6:
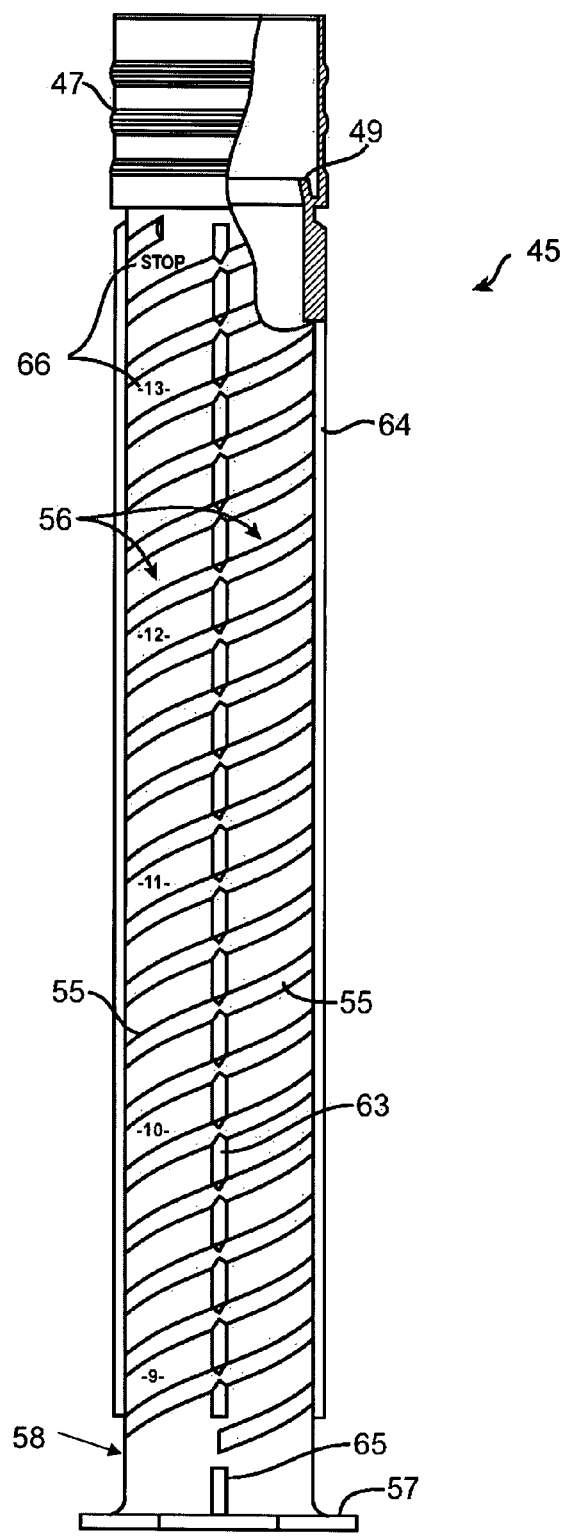
FIG. 6 is a cross-sectional side view of a shank cover of the shank assembly.

As shown in detail in FIG. 6, the threads 55 on the outer surface 58 of the shank cover 45 include a plurality of thread sections 56 separated by longitudinal ribs 63 and 64. As shown, the longitudinal rib 63 is a "broken" rib that allows the threads 55 to extend therethrough. The longitudinal rib 64 is continuous through the threads 55. These and other types of ribs and combinations thereof may also be used.

The shank cover 45 also has a plurality of alignment slots 65 that are aligned with the longitudinal ribs 63 or 64. Preferably four (4) vertical thread sections 56 and four (4) sets of alignment slots 65 are used. As shown, the shank cover outer surface 58 is divided into four quadrants by the alignment ribs 63 and 64. Thus, the threads 55 may be referred to as "quad-threads." The quad-threads 55 allow multiple, e.g., four (4), possible alignment positions, which are identical, to assist the assembly process. The assembly process is simplified because it is now possible to assemble the first and second hollow members 43 and 45 at four different alignment positions without having to change the assembly equipment.

The outer surface 58 of the shank cover 45 has a plurality markings 66 for indicating a relative position between the shank cover 45 and the valve body 27 when they are coupled together. The height of the fill valve 11 (FIG. 1) can thus be adjusted based on the markings 66. The markings 66 may be engraved after the shank cover 45 is molded, or may be formed during the molding process.

Figure 7:
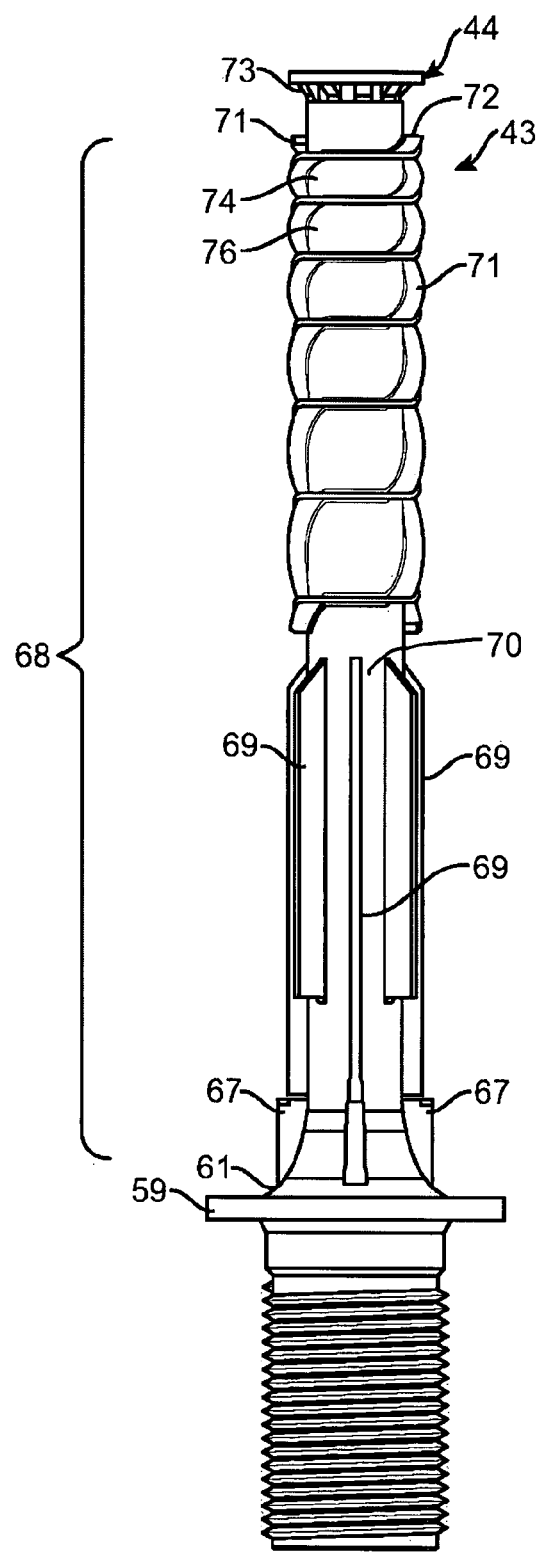
FIG. 7 is a side view of a inner main shank of the shank assembly.

The inner main shank 43 is illustrated in detail in FIG. 7. The inner main shank 43 has a tortuous outer surface 68. Various designs and functions of the tortuous outer surface 68 have been described in U.S. patent application Ser. No. 11/594,620, which is assigned to the assignee of the present application, and the disclosure of which is hereby incorporated by reference in its entirety.

A plurality of alignment ribs 67 on the outer surface 68 of the inner main shank 43 are used to fit into the alignment slots 65 of the shank cover 45 (FIG. 6), and guide the shank cover 45 into place when coupling the main shank 43 and the shank cover 45.

The tortuous outer surface 68 also includes a plurality of flow adjusting ribs 69. The flow adjusting ribs 69 and the shank cover 45 form a plurality of channels 70 within the flow path 21 (FIG. 5A), to straighten and smooth the water flow before it exits the fill valve. As shown, some of the flow-adjusting ribs 69 are aligned with some of the alignment ribs 67.

The tortuous surface 68 also includes a plurality of, preferably two, spiral members 71 and 72. The spiral members 71 and 72 together with the shank cover 45 form a plurality of spiraled flow paths 74 and 76. A plurality of windows 73 are formed at the top portion 44 of the inner main shank 43, allowing water to flow through the top portion 44 to enter the flow paths 74 and 76.

The dual spiral members 71 and 72 gradually decrease in pitch, e.g., the gap between the spiral members 71 and 72 increases, as they extend downwardly, thus allowing the water to slowly expand while flowing down along the paths 74 and 76, reducing cavitation caused by sudden changes in the flow. Such a design also helps reduce the flow rate at all water pressures. Thus, the fill valve can be balanced to reduce the noise during operation. The flow adjusting ribs 69 located downstream the spiral surfaces 71 and 72 also help reduce the water noise.

Figure 8:
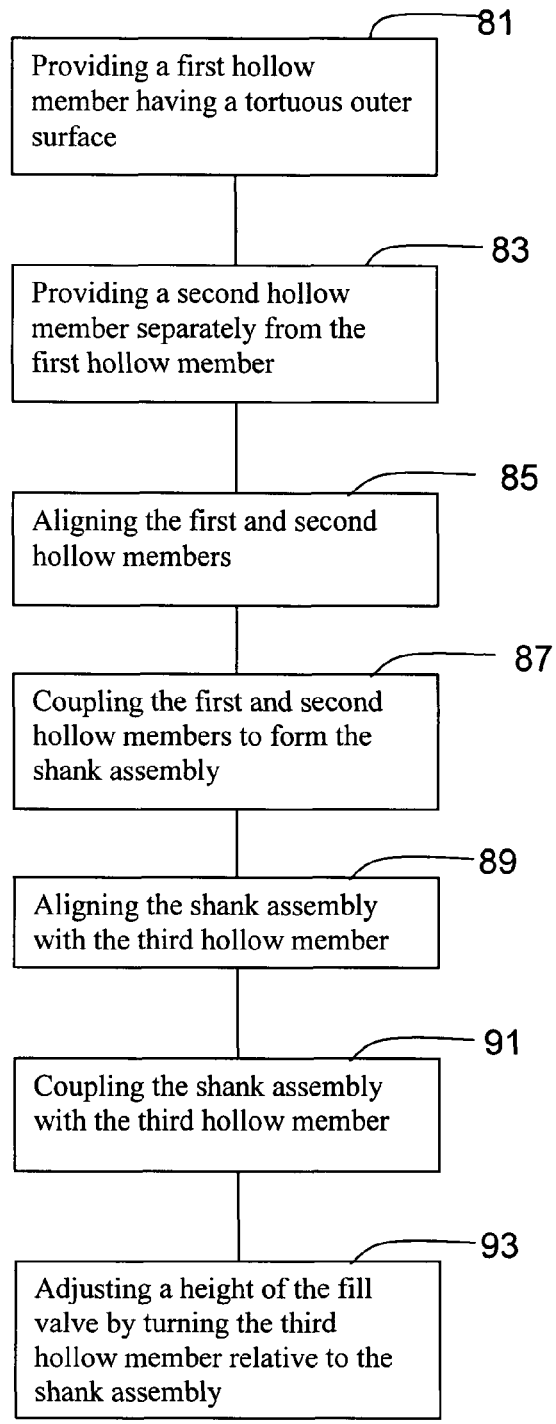
FIG. 8 is a diagram illustrating a preferred method of assembling the fill valve according to embodiments of the invention.

A preferred method of assembling the fill valve according to an embodiment of the invention is summarized in the flowchart in FIG. 8. In step 81, a first hollow member, or the inner main shank, having a tortuous outer surface is provided, e.g., through a molding process. In step 83, a second hollow member, the shank cover, is provided separately. In step 85, the alignment ribs of the first hollow member are aligned with the slots on the second hollow member. In step 87, the first and second hollow members are coupled together using, e.g., the snap joint, to form the multi-piece shank assembly. In step 89, the multi-piece shank assembly is aligned with a third, outer hollow member (the valve body) by, for example, aligning the alignment slots of the third hollow member with the longitudinal ribs on the second hollow member. In step 91, the shank assembly and the third outer hollow member are coupled together by, for example, the locking bumps and the threads.

The seal beads on the outer surface of the second hollow member seal the gap between the second hollow member and the third hollow member. Turning the third hollow member relative to the shank assembly in step 93 may adjust the length of the fill valve. The assembly process can be highly automated.

Advantageously, the multi-piece shank assembly according to embodiments of the invention simplifies the molds used in molding components of the fill valve. Thus, tools with larger cavity can be more easily implemented. By simplifying the molds, the molding cycle time can be reduced. In addition, parts can be more easily made from alternative materials. The part consistency is improved by using a hot runner system. The uniform wall thickness reduces voids and stress in the parts.

The needs for the positioner and the O-ring are eliminated. The quad-thread design in accordance with a preferred embodiment of the invention also improves automated assembly process, as alignment between the shank assembly and the hushbody becomes less critical. Automated, continuous-motion assembly machine can be used to speed up assembly process.

The performance of the fill valve can also be improved through the multi-piece shank design in accordance with a preferred embodiment of the invention. By molding the first and second members separately, more sophisticated geometry to reduce the water noise can be incorporated.

Another advantage of the simple part design is the possibility of using more cost-effective materials with properties better suited for use in the harsh fill valve environments. The way the two members are divided allows one member, e.g., the first member, to provide the main structural support. Thus, the first member can be made from a stronger material, while the second member handles little stress and can be made from softer, perhaps less expensive, material. By using a softer and resilient material for the second hollow member, seal beads can be unitarily formed on its outer surface. Such seal beads are sufficiently effective for preventing major leaks, and can thus replace the O-rings.

The multi-piece shank design also creates opportunities to improve other components on the fill valve in future improvements. One example is the freedom to reduce the shank diameter and the valve body diameter, so that more clearance can be obtained between the valve body and the float.

It is to be expressly understood that although one preferred embodiment of the shank assembly according to the invention has been described above with reference to a two-piece shank assembly, the shank assembly may comprise more than two pieces.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. A shank assembly for a fill valve, comprising:
   a first hollow member having a tortuous outer surface; and
   a second hollow member coupled to the first hollow member to form a plurality of flow paths between the tortuous outer surface and the second hollow member, wherein the second hollow member has a threaded outer surface comprising a plurality of thread sections, wherein the plurality of thread sections are symmetrically divided by a plurality of longitudinal ribs.

2. A shank assembly for a fill valve, comprising:
   a first hollow member having a tortuous outer surface; and
   a second hollow member coupled to the first hollow member to form a plurality of flow paths between the tortuous outer surface and the second hollow member, wherein the first hollow member comprises a plurality of alignment ribs, and wherein the second hollow member comprises a plurality of alignment slots receiving the plurality of alignment ribs of the first hollow member, and wherein the first hollow member comprises a plurality of flow adjusting ribs located downstream of the tortuous outer surface, and wherein at least one of the flow adjusting ribs is aligned with one of the alignment ribs.

3. A fill valve apparatus for filling a tank with fluid, comprising:
   a shank assembly comprising:
   a first hollow member having a tortuous outer surface;
   a second hollow member coupled to the first hollow member to form a plurality of flow paths between the tortuous outer surface and the second hollow member, wherein the second hollow member has a threaded outer surface, and wherein the threaded outer surface of the second hollow member comprises a plurality of thread sections; and
   a third hollow member coupled to the shank assembly, wherein the third hollow member comprises a plurality of locking bumps in an inner surface, the locking bumps being coupled to the plurality of thread sections of the second hollow member, wherein the second hollow member further comprises a plurality seal beads on an outer surface for substantially sealing a gap between the second hollow member and the third hollow member.

4. The apparatus of claim 3, wherein the seal beads are formed integrally with the second hollow member.

5. A method for assembling a toilet fill valve, comprising:

providing a first hollow member having a tortuous outer surface;

providing a second hollow member separately from the first hollow member; and coupling the second hollow member to the first hollow member to form a shank assembly, the shank assembly having a plurality of flow paths formed between the tortuous outer surface and the second hollow member, wherein the second hollow member has a threaded outer surface comprising a plurality of thread sections separated by a plurality of longitudinal ribs, the method further comprising:

providing a third hollow member having a plurality of locking bumps on an inner surface and a plurality of alignment slots;

aligning the plurality of alignment slots of the third hollow member with the longitudinal slots; and coupling the shank assembly with the third hollow member by engaging the locking bumps with the thread sections.

6. The method of claim 5, further comprising adjusting a height of the fill valve by rotating the third hollow member relative to the shank assembly.

7. The method of 5, further comprising substantially sealing a gap between the third hollow member and the shank assembly with a plurality of sealing beads on an outer surface of the second hollow member.

* * * * *